United States Patent
Hamada et al.

(10) Patent No.: US 6,551,741 B1
(45) Date of Patent: Apr. 22, 2003

(54) BATTERY MODULE

(75) Inventors: Shinji Hamada, Toyohashi (JP); Hiroshi Inoue, Toyohashi (JP); Noriyuki Fujioka, Kosai (JP); Munehisa Ikoma, Toyohashi (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 0 days.

(21) Appl. No.: 09/590,763

(22) Filed: Jun. 8, 2000

(30) Foreign Application Priority Data

Jun. 10, 1999 (JP) .......................... 11-163335
Mar. 31, 2000 (JP) ........................ 2000-098003

(51) Int. Cl.[7] .................................... H01M 10/64
(52) U.S. Cl. ................................ 429/151; 429/153
(58) Field of Search ........................ 429/53, 61, 87, 429/82, 88, 97, 98, 99, 147, 148, 149, 151, 152, 156, 163

(56) References Cited

U.S. PATENT DOCUMENTS 4,407,911 A * 10/1983 Hooke .................... 429/159
6,197,446 B1 * 3/2001 Fukuda et al. ............ 429/142
6,255,014 B1 * 7/2001 Dougherty et al. ........ 429/161
6,444,353 B1 * 9/2002 Takaki et al. ............. 429/120

FOREIGN PATENT DOCUMENTS

| EP | 0669663 | 8/1995 |
| EP | 0771037 | 5/1997 |
| EP | 0962993 | 12/1999 |
| JP | 07161377 | 6/1995 |
| JP | 08031398 | 2/1996 |
| WO | WO98/31059 | 7/1998 |
| WO | WO99/21236 | 4/1999 |

* cited by examiner

Primary Examiner—Randy Gulakowski
Assistant Examiner—Monique Wills
(74) Attorney, Agent, or Firm—Jordan and Hamburg LLP

(57) ABSTRACT

An integrated battery case 2 is made by coupling together a plurality of cell cases 3 into an integral body, open ends of the cell cases 3 being closed integrally with a lid member 4. Communicating paths 37 for communicating a suitable number of neighboring cell cases 3 with one another are provided in the lid member 4, whereby the cell cases 3 have a uniform internal pressure.

11 Claims, 10 Drawing Sheets

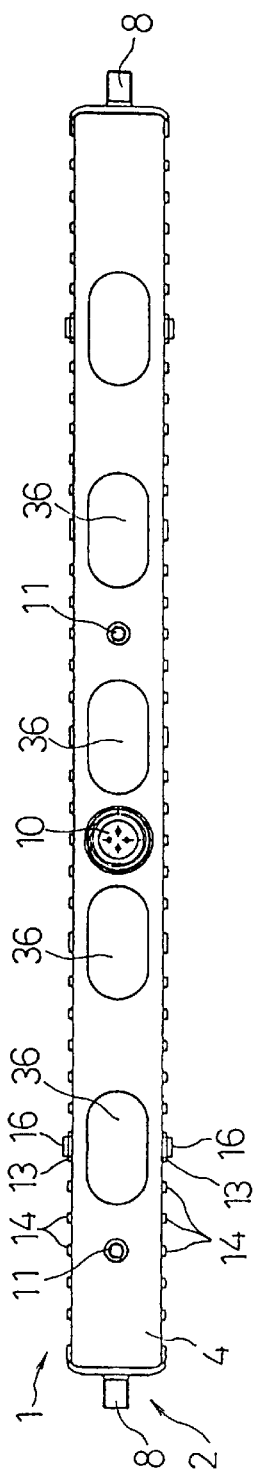
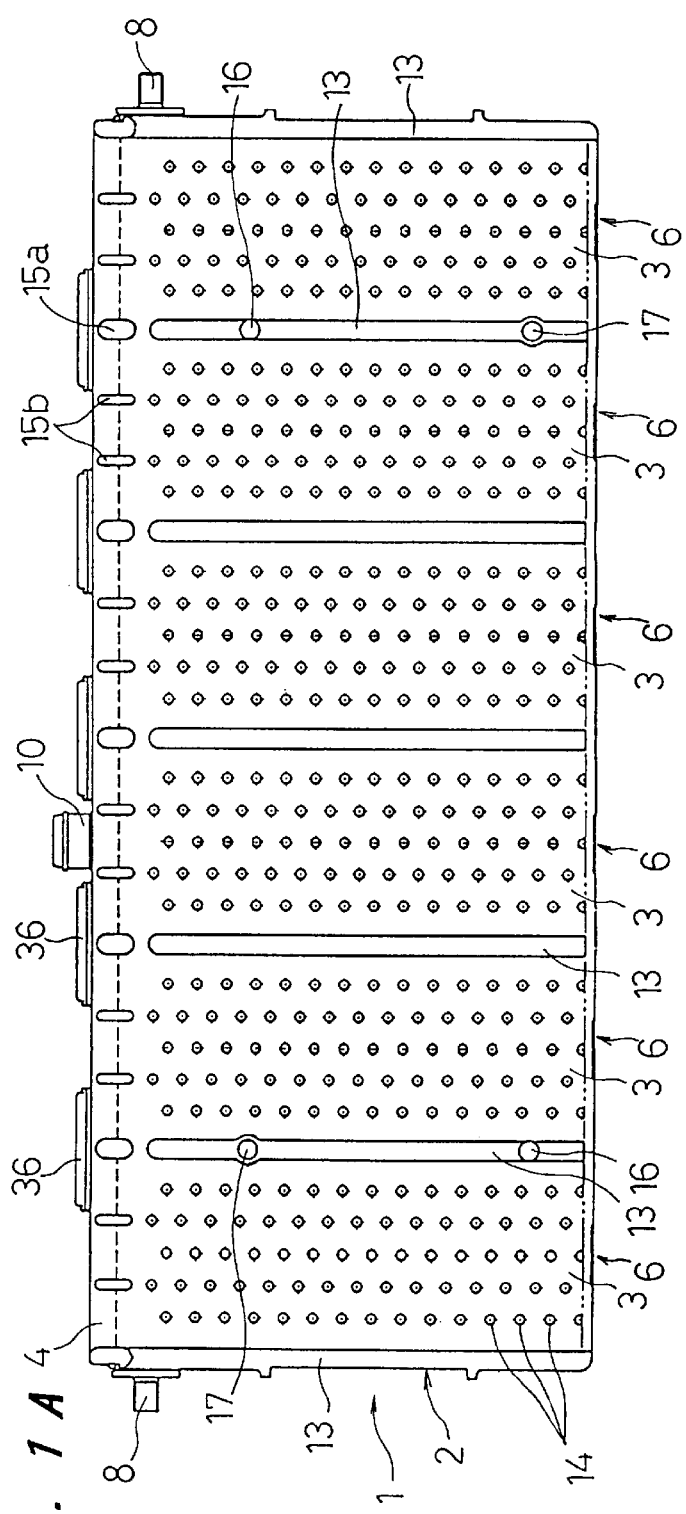

BATTERY MODULE

BACKGROUND OF THE INVENTION

1. Technical Field of the Invention

The present invention relates to a battery module made by connecting a plurality of rechargeable batteries so as to obtain a necessary power capacity.

2. Description of Related Art

FIG. 13 shows a conventional battery module made by connecting a plurality of cells and coupling them integrally so as to obtain a necessary power capacity. In this battery module, a plurality of cells 41 (41a to 41j) made of sealed alkaline rechargeable batteries as shown in FIG. 14 are arranged in a row with the long side walls of the cell cases 42 adjacent with each other. End plates 52 are placed against the outside of the cells 41a and 41j at the opposite ends, and the cells, together with the two end plates 52, 52, are bound together with binding strips 53, whereby the plurality of cells are coupled into an integral body.

In the cells 41, an electrode plate group 47, or elements for electromotive force, made by laminating negative plates and positive plates with intervening separators, is accommodated in a cell case 42 together with an electrolyte, and the opening of the cell case 42 is closed with a lid 46 provided with a safety vent 45. From the upper end of the positive plates on one side of the electrode plate group 47, leads 49 extend upward and are connected to a positive terminal 43 thereabove, and similarly, from the upper end of the negative plates on the other side of the electrode plate group, leads 49 extend upward and are connected to a negative terminal 44 thereabove. The positive terminal 43 and the negative terminal 44 are attached to the lid 46.

The positive terminals 43 and negative terminals 44 of neighboring cells 41, 41 that are coupled together are connected by connection plates 51, thereby connecting all cells 41 in series. When the cell cases 42 are coupled, ribs 48, which protrude vertically from the long side walls of the cell cases 42, are abutted against each other, so as to form coolant passages which extend in the vertical direction of the long side walls of the cell cases 42. The cells 41a to 41j are cooled by flowing air through these coolant passages.

However, in this conventional battery module, because the plurality of cells 41 are completely separate and sealed from each other, there was the following problem. When the internal pressure in some of the cells 41 rises due to variations in capacity or temperature of the cells 41, deterioration of the electrode plates of the cells 41 caused by oxidation is accelerated, which in turn leads to increased variations in the internal pressure and progress of deterioration between various cells 41. As a result, the balance of the condition of the electrode plates of the cells 41 in the battery module is disturbed, and inconveniences such as overcharging and over-discharging occur in some of the cells 41, which leads to a decrease in the lifetime of the battery module.

Moreover, safety vents 45 for releasing gas to the outside when the internal pressure in the cells 41 exceeds a certain value have to be provided for each of the cells 41, so that there was the problem that the number of safety vents 45 to be installed is large and the costs are high.

SUMMARY OF THE INVENTION

In view of these problems of the prior art, it is an object of the present invention to provide a battery module, by which the lifetime of the battery module can be extended by acquiring balance in the progress of deterioration of the electrode plates between various cells that constitute the battery module, and by which costs can be lowered by reducing the number of safety vents to be installed.

A battery module according to the present invention comprises an integrated battery case that is constituted by coupling together a plurality of cell cases into an integral body; and an integral lid member for closing open ends of the plurality of cell cases, wherein communicating paths are provided for communicating a predetermined number of neighboring cell cases with one another. Because the insides of the cell cases are mutually communicated through the communicating paths, the internal pressure in the cell cases becomes equal and gas that is generated in those cells whose deterioration is most advanced is absorbed by other cells, thereby suppressing the progress of oxidation deterioration of the most deteriorated cell and ensuring good balance in the internal pressure and the progress of deterioration between various cells, whereby the lifetime of the battery module is increased.

If the communicating paths are formed in the lid member, neighboring cell cases are communicated with one another without providing spaces for communicating paths in the cell case. Thus balance is acquired between various cells and the lifetime of the battery module can be increased similarly as above with a simple and compact configuration.

It is preferable that through holes be formed on the top face of the lid member at positions corresponding to abutting ends of adjacent cell cases, and that communicating lids formed with communicating paths for communicating these through holes be attached tightly to the top face of the lid member. Thereby, the communicating paths are arranged above the top face of the lid member, and transfer of the electrolyte between the cell cases can be prevented reliably.

If the communicating paths are formed by monolithic molding in the lid member, the number of parts can be reduced because the communicating lids become unnecessary, and since there are no fixing parts, the inner walls of the communicating path have a smooth surface, so that the electrolyte hardly adheres thereto and a short-circuit due to transfer of the electrolyte between the cell cases can be prevented. Also, because the communicating paths are formed by monolithic molding, high strength of the lid member against internal pressure can be achieved.

Partitions may be formed in the lid member such as to be bonded to the side walls of the cell cases of the integrated battery case, and to extend upward to the proximity of the height of the top face of the lid member, so as to form communicating paths in a portion above and on both sides of the partitions. While the cross section of the communicating paths above the partitions for letting gas flow can be made large, high strength of the lid member against internal pressure can be achieved, due to the communicating paths being formed by monolithic molding and due to these partitions. Moreover, transfer of the electrolyte between the cell cases can be prevented more reliably, because the communicating paths are formed near the top face of the lid member.

By making the surface of the communicating paths of a material that is repellent against an electrolyte, or by providing a projection in the communicating paths, transfer of the electrolyte between the cell cases can be prevented more reliably.

By providing a single safety vent in the lid member for a plurality of cell cases mutually communicated, the number of safety vents to be installed can be reduced, whereby cost can be decreased.

Furthermore, by making the thickness of shorter side walls between adjacent cell cases in the integrated battery case smaller than the thickness of outer side walls of the two cell cases located at either end of the battery module, the volume density of the battery module as a whole can be increased and the connection resistance between the cells can be lowered.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 1A is a front view and FIG. 1B is a top plan view showing a battery module in a first embodiment of the present invention;

PREFERRED EMBODIMENTS OF THE INVENTION

A battery module according to a first embodiment of the present invention will be hereinafter described with reference to FIGS. 1 to 6.

Figure 2:
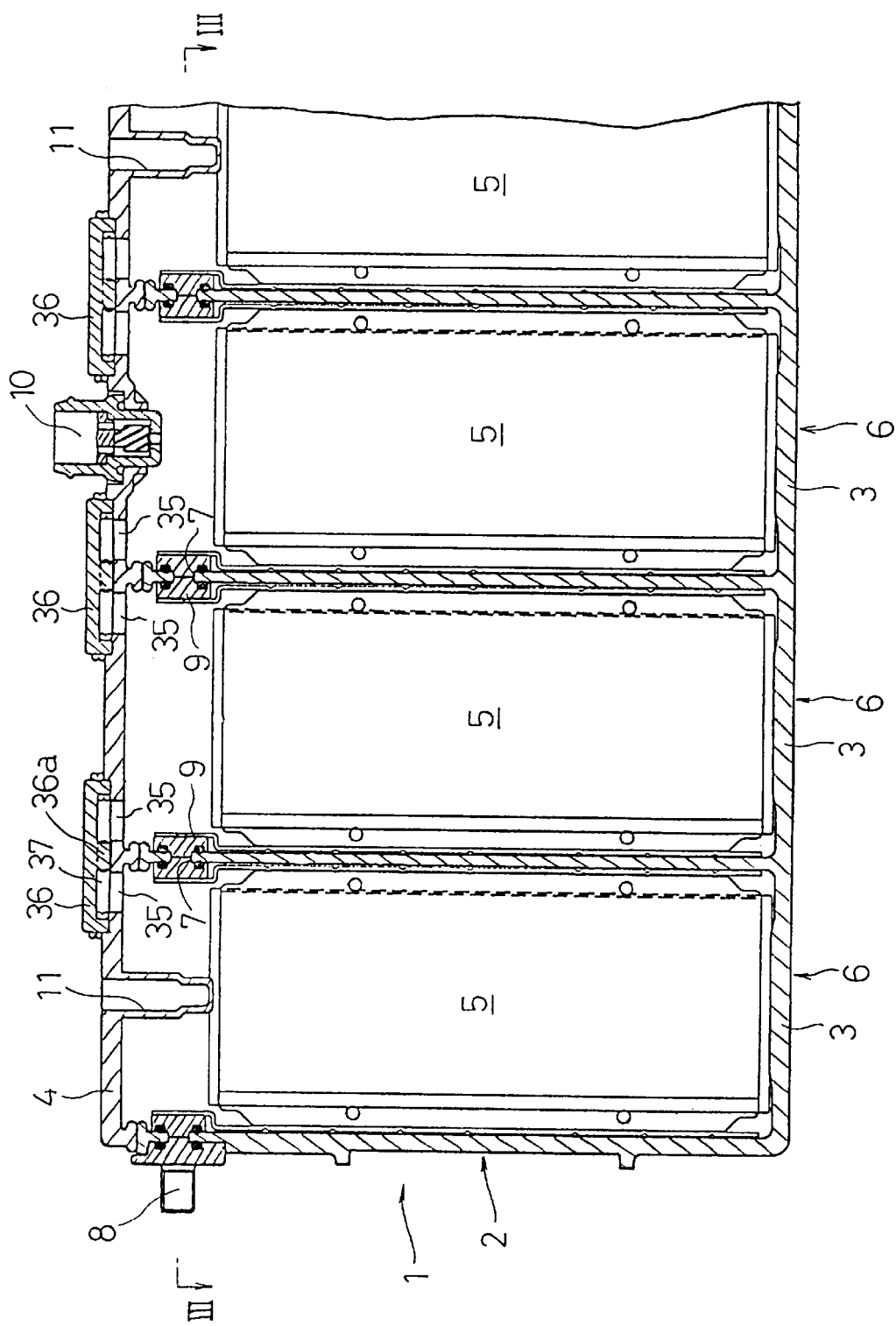
FIG. 2 is a partial longitudinal cross-sectional side view of the same embodiment.
Figure 3:
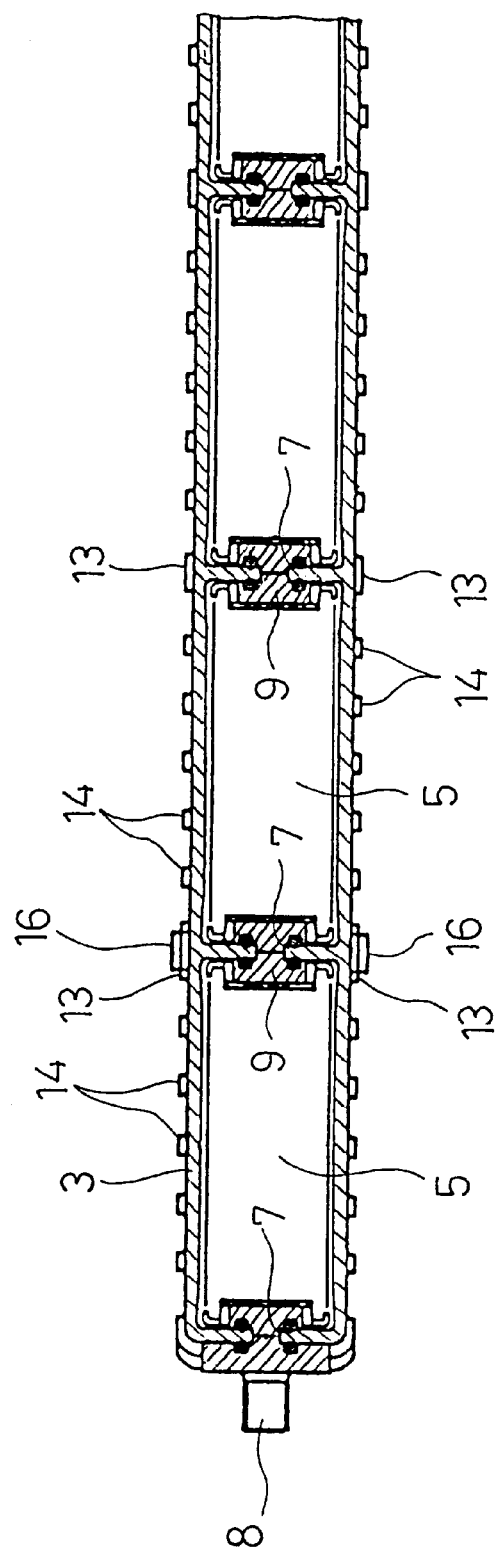
FIG. 3 is a cross-sectional view taken along III—III in FIG. 2.

The battery module 1 of this embodiment constitutes a nickel metal hydride battery, which is suitable for use as a drive power source for an electric vehicle. As shown in FIGS. 1 to 3, it includes an integrated battery case 2 made by coupling together into an integral body a plurality (six in the example shown in the drawing) of cell cases 3, which are formed in a prismatic fashion with short side walls, long side walls, and open top ends, their short side walls being mutually integrated. The open top ends of the cell cases 3 are closed by an integrated lid member 4.

As will be explained in detail below, electrode plate groups 5 of a large number of negative plates and positive plates that are layered in the direction of the short side walls in parallel to the long side wall of the cell cases 3 with intervening separators are accommodated in the cell cases 3 together with electrolyte, thus constituting cells 6.

Connection holes 7 are formed on the upper edge portions of the short side walls at the outer short side walls of the cell cases 3 at the opposite ends of the integrated battery case 2 and between each two cell cases 3, 3. A positive or negative connection terminal 8 is mounted to the connection holes 7 at the outer short side walls of the two outer cell cases 3 and metal connection fittings 9 for serially connecting two adjacent cells 6, 6 are mounted to the connection holes 7 in the short side walls between each two intermediate cell cases 3, 3.

On the top face of the lid member 4, through holes 35 are formed in adjacent edge portions of neighboring cell cases 3, 3. Communicating lids 36 forming communicating paths 37 for connecting two through holes 35, 35 are welded onto the lid member 4. Numeral 36a denotes reinforcing protrusions protruding from the middle of the inner wall of the communicating lids 36. The size of the reinforcing protrusions 36 is such that they do not close the communicating paths 37, and their leading ends are abutted against and welded to the top face of the lid member 4, ensuring the pressure strength of the communicating lids 36. The integrated battery case 2, the lid member 4 and the communicating lids 36 are made of a synthetic resin material, such as a PP/PPE alloy, and they are repellent against the electrolyte. It is also possible to make only the lid member 4 and the communicating lids 36 of an electrolyte-repellent material, or to provide only the surface of the communicating paths 37 with a coating of a fluid-repellent material.

A single safety vent 10 for releasing pressure when the internal pressure in the cell cases 3 has exceeded a certain value is provided on the top face of the lid member 4. Moreover, a sensor mounting hole 11 for mounting a temperature detection sensor that detects the temperature in the cells 6 is formed as an indentation, the bottom end of which contacts the upper edge of the electrode plate group 5 of one of the cells 6.

On the long lateral wall 12 of the integrated battery case 2, which is formed as one plane by the long side walls of the cell cases 3, protruding ribs 13 that extend vertically are provided at positions corresponding to the lateral edges of two adjacent cell cases 3. Further, a large number of relatively small circular protrusions 14 are formed at suitable intervals in matrix fashion between each two ribs 13, 13. The ribs 13 and the protrusions 14 have the same height. Furthermore, coupling ribs 15a and 15b having the same height as the ribs 13 and the protrusions 14 are formed on the side walls of the upper edge of the cell cases 3 and the side walls of the lid member 4, such as to bridge across the side walls of the cell cases 3 and the lid member 4 at positions corresponding to an extension of the ribs 13 and the protrusions 14. A plurality of protrusions 16 and indentations 17, for positioning and fitting together integrated battery cases 2 when their long lateral walls 12 are juxtaposed with each other, are arranged at an upper portion and a lower portion of the outer surface of the two ribs 13 near both ends of the long lateral wall 12 of the integrated battery case 2. When the integrated battery cases 2 are arranged in a row in parallel, the ribs 13, the protrusions 14 and the coupling ribs 15a and 15b form coolant passages for cooling the cell cases 3 effectively and uniformly.

Figure 4:
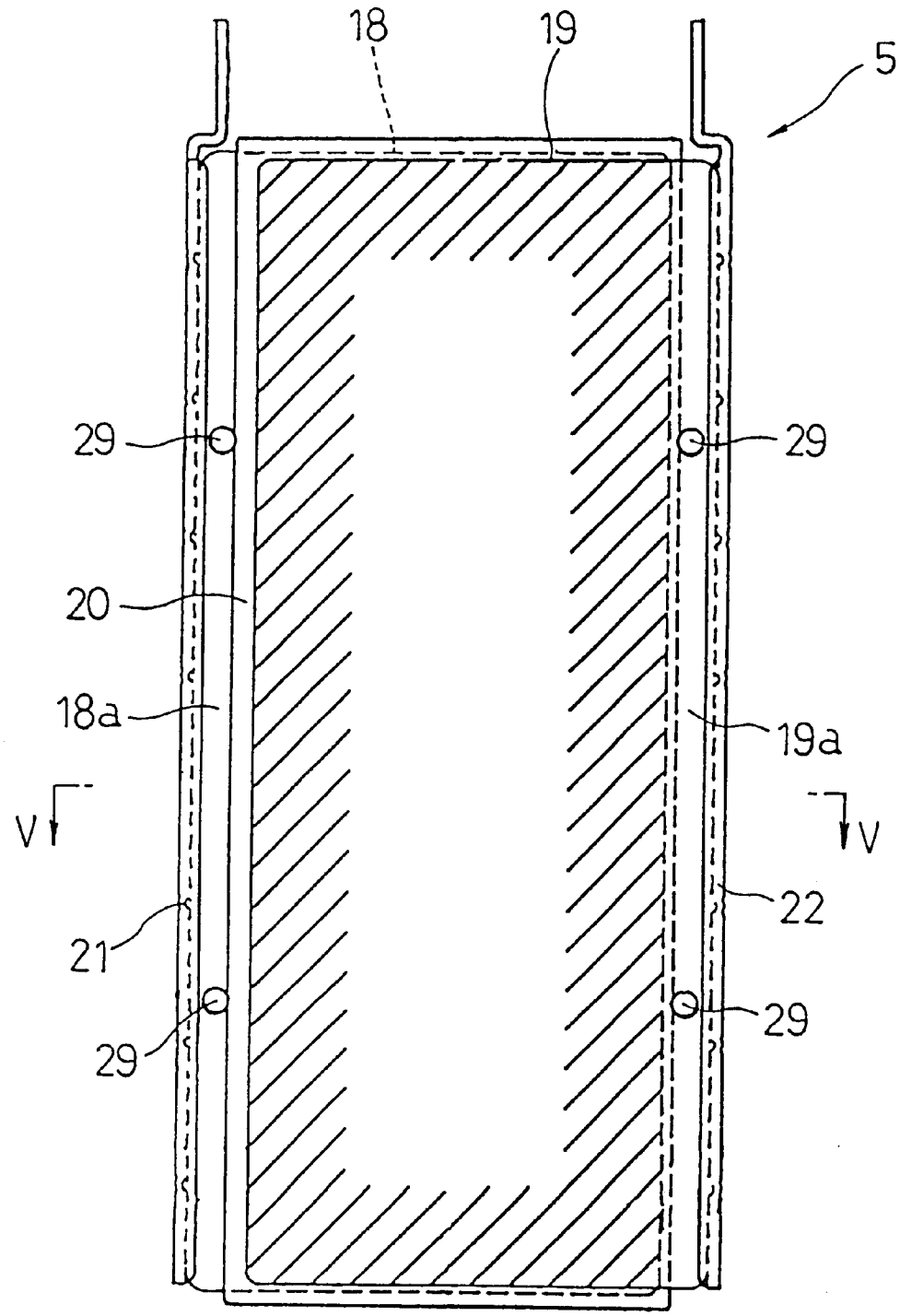
FIG. 4 is a front view of an electrode plate group of the same embodiment.
Figure 5:
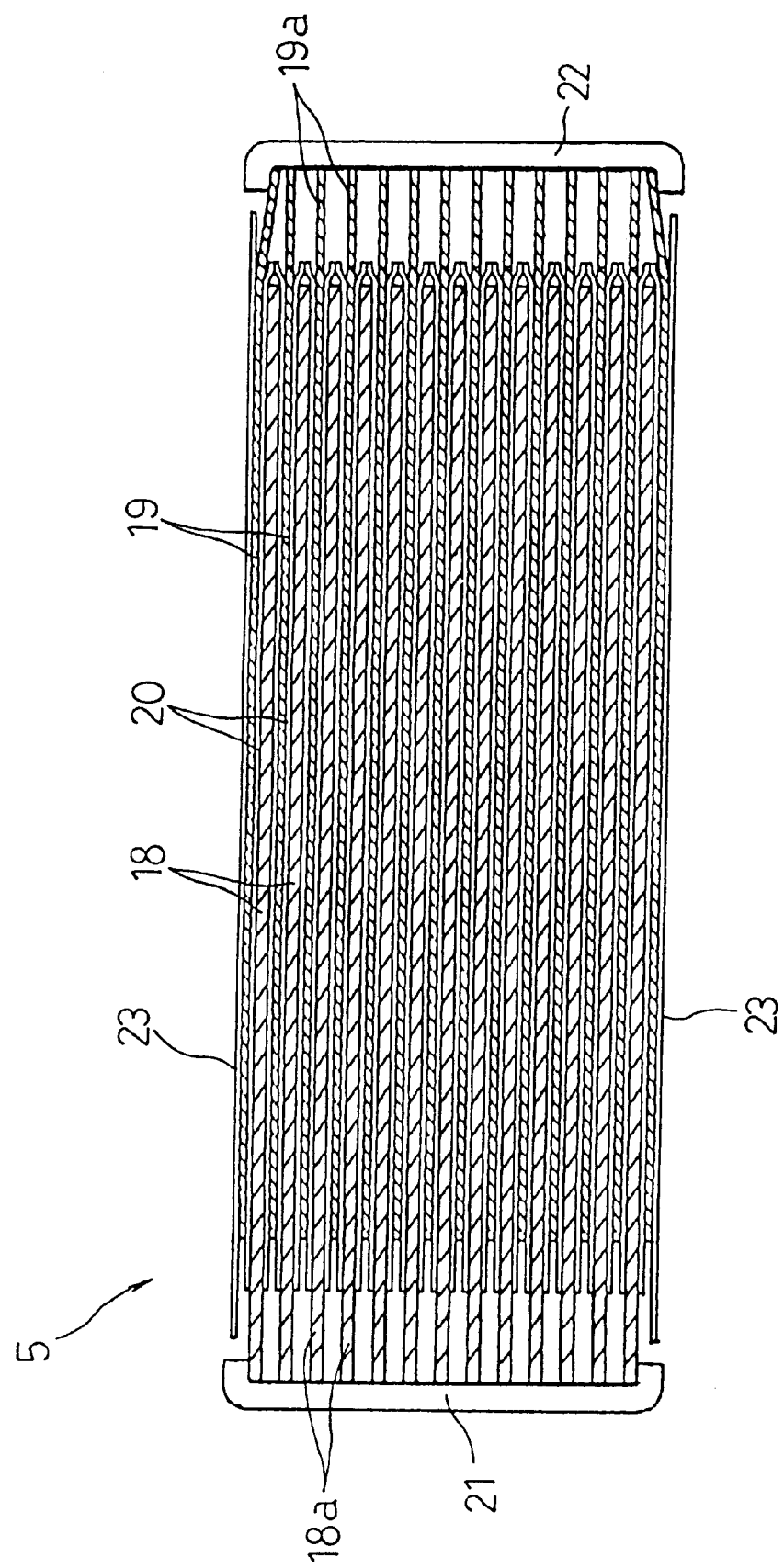
FIG. 5 is a cross-sectional view taken along V—V in FIG. 4.

Next, the aforementioned electrode plate groups 5 are explained in detail with reference to FIGS. 4 and 5. A large number of positive plates 18 made of Ni porous metal and a large number of negative plates 19 of Ni punching metal coated with an active material are arranged alternately, and the positive plates 18 are covered with separators 20 in the form of a bag having an opening on one side. The positive plates 18 and the negative plates 19 are stacked upon one another with the separators 20 therebetween, thereby constituting the electrode plate group 5. In FIG. 4, the region where the positive plates 18 and the negative plates 19 oppose each other with the intervening separators 20 and generate electric power is indicated by oblique lines. The lateral edges of the group of positive plates 18 protrude beyond the group of negative plates 19 on one side and the lateral edges of the group of negative plates 19 protrude beyond the group of positive plates 18 on the opposite side, and these protruding lateral portions form the lead portions 18a and 19a, to the lateral ends of which collector plates 21 and 22 are welded, respectively. The two outer edges of the collector plates 21 and 22 are bent toward the inside and their dimensions are adjusted such that they do not spread to the outside as pressure is applied thereto when they are being welded to the electrode plates 18 and 19. Numeral 23 denotes external separators arranged at the outer faces of the electrode plate group 5 between the collector plates 21 and 22.

Numeral 29 denotes pairs of positioning holes formed in the lead portions 18a and 19a at a suitable distance from the top And the bottom thereof. By inserting positioning pins into these positioning holes 29 and by applying pressure on the lateral ends of the lead portions 18a and 19a, these lateral ends of the lead portions 18a and 19a are aligned and welded reliably and evenly to the collector plates 21 and 22.

Figure 6:
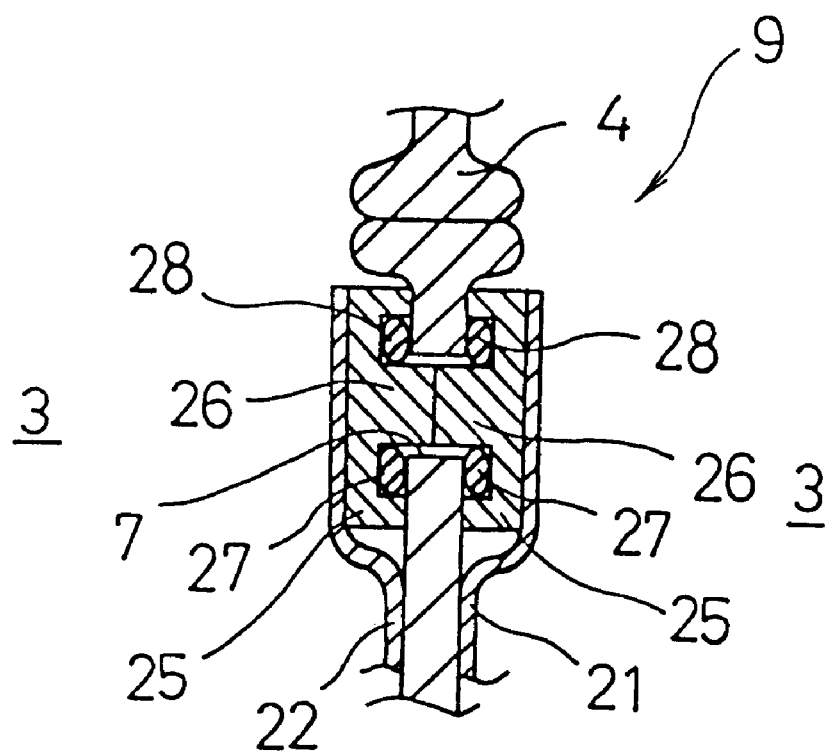
FIG. 6 is a longitudinal cross-sectional view showing the configuration of a portion connecting two cells in the same embodiment.

FIG. 6 shows the connection fitting 9 for serially connecting the cells 6, 6. The connection fitting 9 comprises a pair of frame fittings 25, to the base ends of which the upper ends of the collector plates 21 and 22 of two neighboring cells 6 are welded, respectively. The cells 6, 6 are connected by inserting from both sides protruding portions 26 projecting from an axial portion of the frame fittings 25 into the connection hole 7 formed in the short lateral wall of the cell case 3, and abutting their leading faces against each other and welding them together. The bonding of the upper ends of the collector plates 21 and 22 to the base ends of the frame fittings 25 and the welding of the leading faces of the protruding portions 26 is performed by resistance welding all together after they have been assembled. Annular grooves 27 are formed around the protruding portions 26 of the frame fittings 25, and the connection hole 7 is sealed double with O-rings 28 mounted in these annular grooves 27.

In the battery module 1 of the present invention, as described above, the integrated battery case 2 is constituted by mutually connecting a plurality of prismatic cell cases 3, abutted on their short side walls. The open ends of the cell cases 3 are closed by the integrated lid member 4, and the collector plates 21, 22 of the electrode plate groups 5 in adjacent cells are connected via the connection fittings 9, that pass through the connection holes 7 formed in the upper edges of the short side walls of each cell case 3. Therefore, neighboring cells 6 can be connected inside the integrated battery case 2. Because the connection configuration is not exposed to the outside, the installation space for the battery module 1 can be made compact.

Moreover, because the insides of the cell cases 3 are communicated with each other through communicating paths 37, the pressure inside the cell cases 3 becomes equal and gas that is generated in the cells 6 whose deterioration is most advanced can be absorbed by the other cells 6 so that the oxidation deterioration of the most deteriorated cells 6 can be suppressed. Since balance is acquired in the internal pressure and the progress of deterioration between various cells 6, 6, the overall lifetime of the battery module 1 can be increased. Furthermore, through holes 35 are formed in the top face of the lid member 4 and covered with communicating lids 36 having communicating paths 37 formed therein, so that the communicating paths 37 are positioned above the top face of the lid member 4. Moreover, since the communicating paths 37 are of such property as to be repellent against the electrolyte, the electrolyte is prevented from transferring between the cell cases 3 even more effectively and self-discharge due to transfer of electrolyte between cell cases 3, 3 can be prevented.

Moreover, since it is sufficient to provide the lid member 4 with a single safety vent 10, a reduction of cost is achieved.

The connection fittings 9 are made of pairs of frame fittings 25 having protruding portions 26, which are inserted into the connection holes 7 from both sides and whose leading ends are welded together, and to whose base ends the collector plates 21 and 22 are attached, so that the electrode plate groups 5, i.e., the cells 6 of neighboring cell cases 3 can easily be connected in series by welding the frame fittings 25. Also, by arranging connection terminals 8 having similar protruding portions 26 and frame fittings 25 at the short side walls on the outer side of the two outer cell cases 3 and by welding the leading ends of their protruding portions 26, 26 together, the connection of the cell cases 3 on either end with an external terminal can be performed with a compact configuration and in a simple manner.

Moreover, thanks to the O-rings 28 for sealing the cell cases 3 provided around the protruding portions 26 of the frame fittings 25 and the connection terminals 8, both sides of the short side walls of adjacent cell cases 3 are sealed double and leakage of liquid during use can be prevented reliably.

Figure 7:
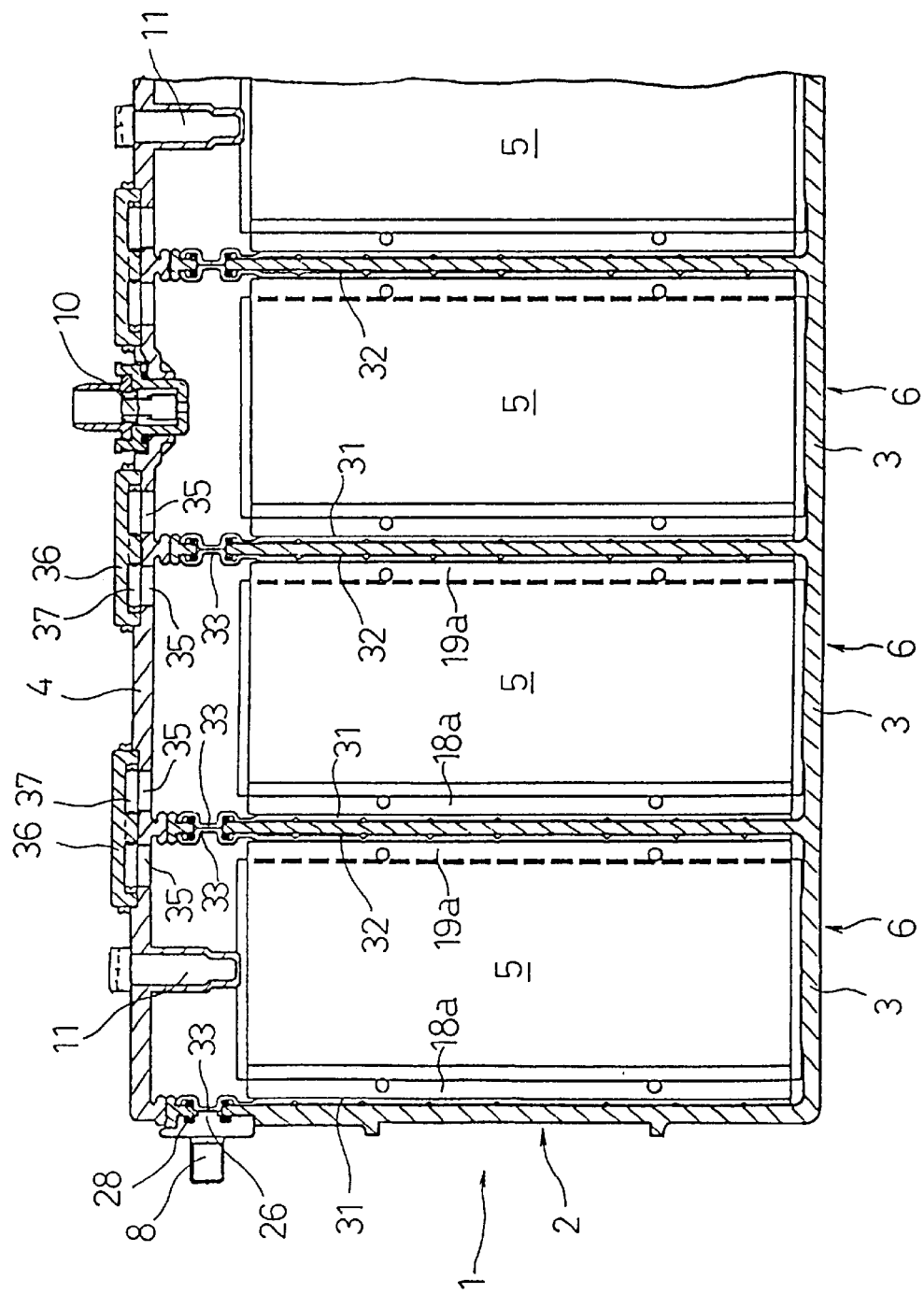
FIG. 7 is a partial longitudinal cross-sectional side view of a battery module in a second embodiment of the present invention.
Figure 8:
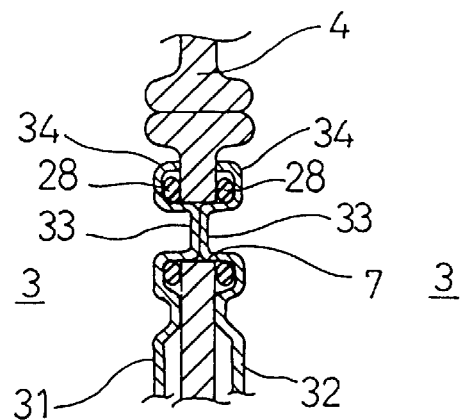
FIG. 8 is a longitudinal cross-sectional view showing the configuration of a portion connecting two cells in the same embodiment.

Next, a battery module according to a second embodiment of the present invention will be described with reference to FIGS. 7 and 8. It should be noted that, in the description of the following embodiments, structural elements that are identical to those in the above embodiment are denoted at the same reference numerals, and only differing aspects will be explained.

In the first embodiment, an example has been explained, in which the collector plates 21, 22 of neighboring cells 6, 6 are connected with connection fittings 9 made of a pair of frame fittings 25. In this embodiment, cells 6 are constituted by accommodating, together with electrolyte, electrode plate groups 5 having collector plates 31, 32 of negative plates and positive plates at the opposite ends of the long lateral sides within prismatic cell cases 3 having short side walls and long side walls. Connection protrusions 33 that fit into the connection holes 7 formed in the upper edges of the short side walls of the cell cases 3 are protruded from the upper end of the collector plates 31 and 32, and the collector plates 31 and 32 of neighboring cells 6, 6 are connected by welding the tips of these connection protrusions 33 together. The collector plates 31, 32 of the two cell cases 3 on both ends are connected to the connection terminals 8 by welding the protruding portions 26 of the connection terminals 8 to the tip of the connection protrusions 33. Annular grooves 34 are formed around the connection protrusions 33 of the collector plates 31, 32 on both sides of the short side walls of the cell cases 3 and around the protruding portions 26 of the connection terminals 8, and O-rings 28 are provided for sealing them against the short side walls.

With this configuration, cells 6 can be connected to the outside with a compact configuration with a reduced number of parts, because the frame fittings 25 used in the first embodiment become unnecessary. Moreover, double sealing with O-rings 28 arranged at both sides of the short side walls of the cell cases 3 can reliably prevent the leakage of liquid during use.

Figure 9:
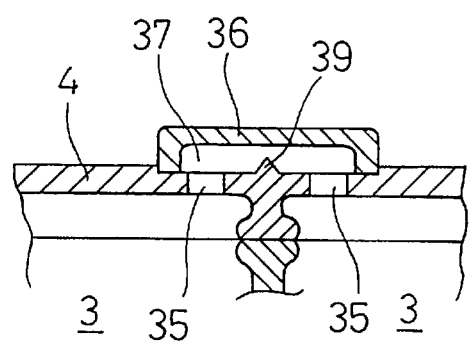
FIG. 9 is a longitudinal cross-sectional view of the communicating path between cell cases of a battery module in a third embodiment of the present invention.

A battery module according to a third embodiment of the present invention will be described next. In the first and second embodiments, through holes 35 are provided in the top face of the lid member 4, which are covered by communicating lids 36 having recesses that form the communicating paths 37. In this embodiment, a protruding dike 39 with a triangular cross-section is provided, traversing the communicating path 37 between two through holes 35, 35 in the top face of the lid member 4, as shown in FIG. 9. This prevents the electrolyte from transferring between neighboring cell cases 3, 3 through the communicating path 37 even more reliably.

Figure 10:
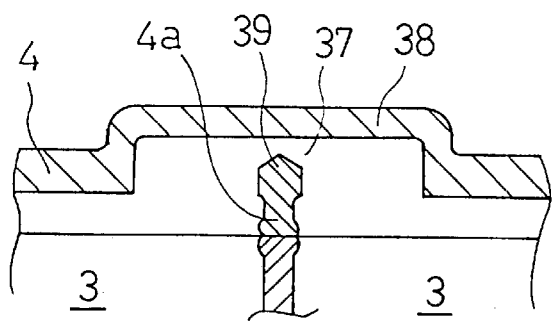
FIG. 10 is a longitudinal cross-sectional view of the communicating path between cell cases of a battery module in a fourth embodiment of the present invention.

A battery module according to a fourth embodiment of the present invention will be described next. In the foregoing embodiments, communicating lids 36 are bonded to the lid member 4. In this embodiment, the communicating paths 37 are formed by monolithic molding in the lid member 4, as shown in FIG. 10. Specifically, a partition 4a is formed in the lid member 4 that is to be joined to the side walls of the cell cases 3, 3. The upper end of this partition 4a extends to the proximity of the height of the top face of the lid member 4. In the lid member 4, a protruding portion 38 is formed projecting from the top face of the lid member 4, so as to form a communicating path 37 over a suitable distance in the portion above and on both sides of the partition 4a. Moreover, the upper end of the partition 4a forms a dike 39 with a triangular cross-section.

This configuration has the advantages in that the number of parts can be reduced, and the processing step can be made more simple, because the communicating lids can be dispensed with. Since there are no welding portions in the communicating lids, and since the inner wall of the communicating path 37 has a smooth surface, the electrolyte hardly adheres to it. Accordingly, flow of electrolyte between cell cases 3, 3 relayed by adhering electrolyte can be prevented, and an electrolytic short-circuit can be prevented reliably. Moreover, even when the cross-sectional area of the path above the partition 4a is made larger for the flow of gas, sufficient strength of the lid member against inner pressure can be secured due to the monolithic-molding construction and the presence of the partition 4a, and the electrolyte can be revented even more reliably from transferring between cell cases 3, 3, because the communicating path 37 is provided substantially above the top face of the lid member 4.

Figure 11:
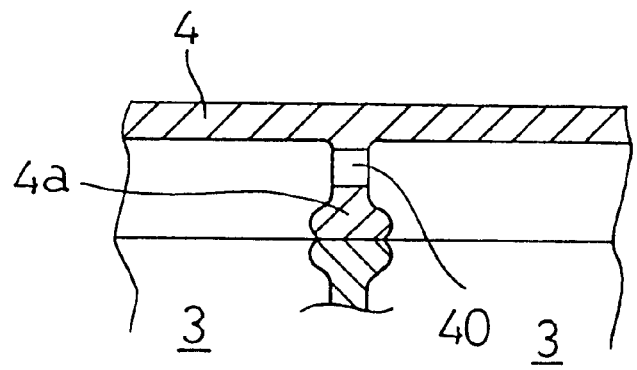
FIG. 11 is a longitudinal cross-sectional view of the communicating path between cell cases of a battery module in a fifth embodiment of the present invention.

A battery module according to a fifth embodiment of the present invention will be described next. In this embodiment, the height of the lid member 4 is made slightly larger, and through holes 40 functioning as communicating paths are formed in the partitions 4a between the cell cases 3, 3, as shown in FIG. 11.

In the foregoing embodiments, examples have been shown, where all (six) cell cases 3 of the integrated battery case 2 are joined together, and only one safety vent 10 is provided. However, it is also possible to provide a plurality of safety vents 10 to obtain sufficient cross-sectional area for the discharge of gas, or to join a suitable number of cell cases 3 together as one group and provide a single safety vent 10 for each group of cell cases 3 that have been joined together.

Figure 12:
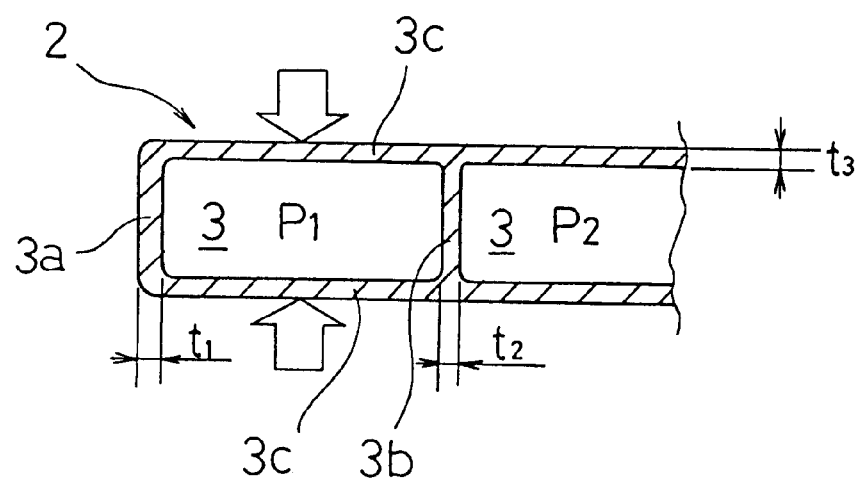
FIG. 12 is a longitudinal cross-sectional view of the communicating path between cell cases of a battery module in a sixth embodiment of the present invention.
Figure 13:
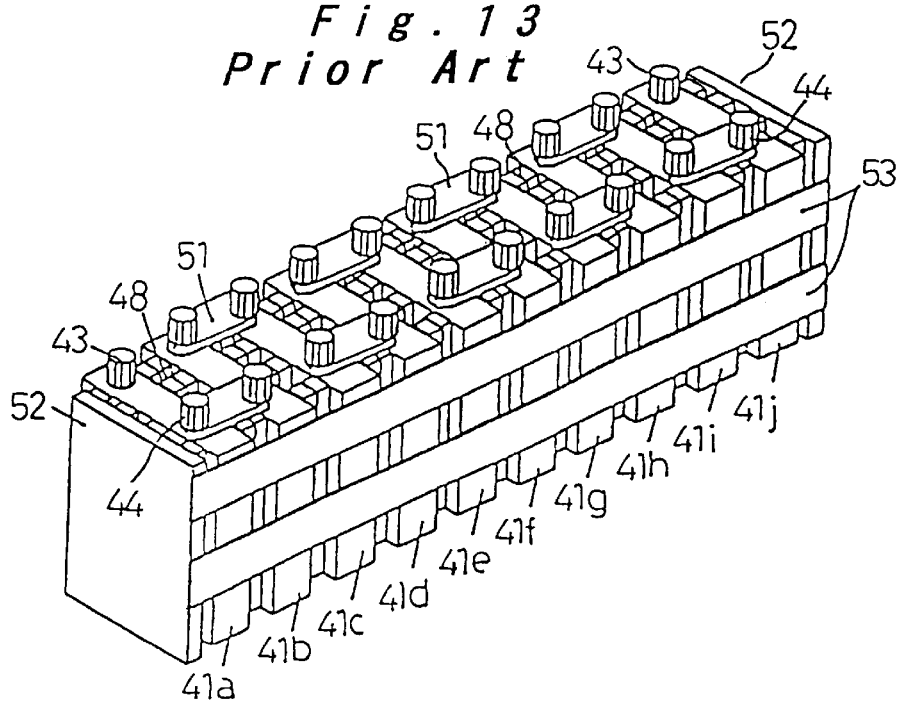
FIG. 13 is an external perspective view of a conventional battery module.
Figure 14:
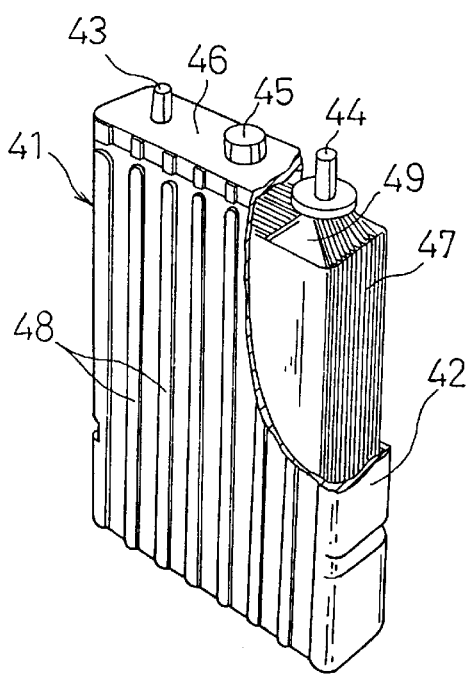
FIG. 14 is a partially cutaway perspective view of a cell of the same conventional example.

A battery module according to a sixth embodiment of the present invention will be described with reference to FIG. 12. In the foregoing embodiments, the wall thickness of the long side walls and the short side walls of the cell cases 3 of the integrated battery case 2 is set identical. However, by providing communicating paths 37 that communicate each of the cell cases 3, the difference in the internal pressures P1, P2 . . . between various cell cases 3 is offset. Thus no load acts on the side walls 3b between neighboring cell cases 3, 3. Thus, in this embodiment, the thickness $t_2$ of the side walls 3b is made smaller than the thickness of the end walls 3a of the two cell cases 3 on the outer side on which a load acts due to the internal pressure in the cell cases 3. Moreover, since the long lateral wall 3c of the integrated battery case 2 formed by the long side walls of the cell cases 3 is used under constraint from both sides, as indicated by the white arrows, its thickness $t_3$ is made smaller than the thickness $t_1$ of the end walls 3a. However, since the long lateral wall 3c of the integrated battery case 2 is subject to a load which is more or less the same or somewhat larger than the load acting on the side walls 3b, its thickness $t_3$ is made the same or somewhat larger than the thickness $t_2$ of the side walls 3b.

In this embodiment, the volume density of the battery module can be increased by reducing the thickness of the side walls 3b between the cell cases 3, 3, the connection resistance between the cells 6, 6 can be reduced, and the costs for the integrated battery case 2 can be lowered.

As is clear from the above description, with the battery module of the present invention, communicating paths for communicating a suitable number of neighboring cell cases are provided, so that the insides of the cell cases are mutually communicated through the communicating paths, the internal pressure in the cell cases becomes equal, and gas that is generated in those cells whose deterioration is most advanced is absorbed by other cells, thereby suppressing the progress of oxidation deterioration of the most deteriorated cells and ensuring good balance in the internal pressure and the progress of deterioration between various cells, whereby the lifetime of the battery module is increased.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising:
   an integrated battery case that is constituted by coupling together a plurality of cell cases into an integral body, each cell case defining an interior cavity;
   an integral lid member for closing open ends of the plurality of cell cases; and
   gaseous communicating paths provided for communicating said interior cavities of neighboring ones of said cell cases with one another.

2. The battery module of claim 1, wherein the communicating paths for communicating a predetermined number of neighboring cell cases with one another are formed in the lid member.

3. The battery module of claim 2, wherein through holes are formed on the top face of the lid member at positions corresponding to abutting ends of adjacent cell cases, and communicating lids formed with the communicating paths for communicating said through holes are attached tightly to the top face of the lid member.

4. The battery module of claim 2, wherein the communicating paths are formed in the lid member by monolithic molding.

5. The battery module of claim 4, wherein partitions are formed in the lid member such as to be bonded on top of the side walls of neighboring cell cases of the integrated battery case, and to extend upward to the proximity of the height of the top face of the lid member, and the communicating paths are formed above and on both sides of said partitions.

6. The battery module of claim 2, wherein a surface of the communicating path is made of a material which is repellent against an electrolyte.

7. The battery module of claim 2, wherein a projection is formed in the communicating paths.

8. The battery module of claim 2, wherein a single safety vent is provided in the lid member for a plurality of cell cases communicating with one another.

9. The battery module of claim 2, wherein the thickness of side walls of adjacent cell cases in the integrated battery case is smaller than the thickness of the outer side walls of two cell cases at either end of the battery module.

10. A battery module comprising:

an integrated battery case that is constituted by coupling together a plurality of cell cases into an integral body;

an integral lid member for closing open ends of the plurality of cell cases;

communicating paths provided for communicating neighboring ones of said cell cases with one another;

the communicating paths for communicating neighboring ones of said cell cases with one another being formed in the lid member;

through holes formed on a top face of the lid member at positions corresponding to abutting ends of adjacent ones of said cell cases; and communicating lids formed with the communicating paths for communicating said through holes being attached tightly to the top face of the lid member.

11. A battery module comprising:

an integrated battery case that is constituted by coupling together a plurality of cell cases into an integral body;

an integral lid member for closing open ends of the plurality of cell cases, wherein communicating paths provided for communicating neighboring ones of said cell cases with one another;

the communicating paths for communicating neighboring ones of said cell cases with one another being formed in the lid member by monolithic molding;

partitions formed in the lid member such as to be bonded on top of the side walls of neighboring ones of said cell cases of the integrated battery case, and to extend upward to the proximity of the height of a top face of the lid member; and the communicating paths being formed above and on both sides of said partitions.

* * * * *